(12) United States Patent  (10) Patent No.: US 7,574,794 B2
Halsey, IV et al.  (45) Date of Patent: Aug. 18, 2009

(54) METHOD OF MANUFACTURING A TOUCH SCREEN

(75) Inventors: Eugene Halsey, IV, Holland, MI (US); Catherine A. Getz, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 11/625,015

(22) Filed: Jan. 19, 2007

(65) Prior Publication Data

US 2007/0122542 A1 May 31, 2007

Related U.S. Application Data

(62) Division of application No. 10/710,164, filed on Jun. 23, 2004, now Pat. No. 7,165,323.

(60) Provisional application No. 60/484,713, filed on Jul. 3, 2003.

(51) Int. Cl.
*H05K 3/02* (2006.01)
*B05D 5/12* (2006.01)

(52) U.S. Cl. .................. 29/846; 29/830; 29/831; 29/832; 29/825; 427/108

(58) Field of Classification Search ............. 29/846, 29/830, 831, 832, 622, 825; 427/58, 162, 427/126.6, 96.1, 97.1, 108, 110; 428/210, 428/209, 428, 332, 412, 701; 438/100; 257/59, 257/72
See application file for complete search history.

(56) References Cited

U.S. PATENT DOCUMENTS

| | | | | |
|---|---|---|---|---|
| 3,020,193 A | * | 2/1962 | Seck | 156/517 |
| 3,293,743 A | * | 12/1966 | Dale | 29/563 |
| 3,415,706 A | | 12/1968 | Ettre | 156/540 |
| 4,290,052 A | * | 9/1981 | Eichelberger et al. | 341/33 |
| 4,318,958 A | * | 3/1982 | Piatt | 428/332 |
| 4,864,084 A | * | 9/1989 | Cardinale | 200/5 A |
| 4,931,782 A | * | 6/1990 | Jackson | 345/174 |
| 5,011,732 A | * | 4/1991 | Takeuchi et al. | 428/209 |
| 5,062,198 A | * | 11/1991 | Sun | 29/622 |
| 5,239,152 A | | 8/1993 | Caldwell et al. | 200/600 |
| 5,277,986 A | | 1/1994 | Cronin et al. | 428/432 |
| 5,525,264 A | | 6/1996 | Cronin et al. | 252/583 |
| 5,538,905 A | | 7/1996 | Nishioka et al. | 437/24 |
| 5,604,626 A | | 2/1997 | Teowee et al. | 359/265 |
| 5,673,041 A | * | 9/1997 | Chatigny et al. | 341/22 |
| 5,725,957 A | | 3/1998 | Varaprasad et al. | 428/428 |

(Continued)

*Primary Examiner*—Derris H Banks
*Assistant Examiner*—Tai Nguyen
(74) *Attorney, Agent, or Firm*—Van Dyke, Gardner, Linn & Burkhart, LLP

(57) ABSTRACT

A method for manufacturing a touch screen that deposits a conductive layer or coating directly onto a surface of a sheet or ribbon or roll of thin glass material. The coated thin glass material may be cut to the desired shape or substrate for use as the outer, thin glass substrate of the touch screen device. Spacer elements and/or other functional coatings or layers or the like may also be applied to the conductive layer or opposite surface of the thin glass ribbon. Optionally, a functional coating or layer may be deposited or applied to a surface of a pre-cut thin glass substrate. The coated pre-cut thin glass substrate may be used as a top sheet for lamination as the protective top sheet of a touch screen device.

21 Claims, 5 Drawing Sheets

U.S. PATENT DOCUMENTS

| | | | | |
|---|---|---|---|---|
| 5,729,379 A | | 3/1998 | Allemand et al. | 359/270 |
| 5,742,118 A | * | 4/1998 | Endo et al. | 313/479 |
| 5,838,483 A | | 11/1998 | Teowee et al. | 359/265 |
| 5,900,275 A | | 5/1999 | Cronin et al. | 427/108 |
| 6,001,486 A | | 12/1999 | Varaprasad et al. | 428/428 |
| 6,040,939 A | * | 3/2000 | Demiryont et al. | 359/360 |
| 6,087,012 A | | 7/2000 | Varaprasad et al. | 428/428 |
| 6,163,313 A | * | 12/2000 | Aroyan et al. | 345/173 |
| 6,261,700 B1 | | 7/2001 | Olson et al. | 428/522 |
| 6,344,288 B1 | * | 2/2002 | Oyama et al. | 428/701 |
| 6,362,414 B1 | | 3/2002 | Fujisawa et al. | 136/256 |
| 6,380,480 B1 | | 4/2002 | Norimatsu et al. | 136/256 |
| 6,395,863 B2 | | 5/2002 | Geaghan | 528/196 |
| 6,440,491 B1 | | 8/2002 | Varaprasad et al. | 427/168 |
| 6,444,898 B1 | * | 9/2002 | Fujisawa et al. | 136/256 |
| 6,627,918 B2 | * | 9/2003 | Mennig et al. | 257/59 |
| 6,706,552 B2 | | 3/2004 | Getz et al. | 438/100 |
| 2001/0024685 A1 | * | 9/2001 | Boulton et al. | 427/162 |
| 2001/0055673 A1 | | 12/2001 | Getz | 428/212 |
| 2002/0031622 A1 | | 3/2002 | Ippel et al. | 428/1.6 |

* cited by examiner

US 7,574,794 B2

METHOD OF MANUFACTURING A TOUCH SCREEN

CROSS REFERENCE TO RELATED APPLICATIONS

The present application is a divisional application of U.S. patent application Ser. No. 10/710,164, filed Jun. 23, 2004, now U.S. Pat. No. 7,165,323, which claims benefit of U.S. provisional application, Ser. No. 60/484,713, filed Jul. 3, 2003, which are hereby incorporated herein by reference in their entireties.

FIELD OF THE INVENTION

The present invention relates generally to touch screens and methods for manufacturing touch screens.

BACKGROUND OF THE INVENTION

As the use of touch screens, such as for public information kiosks, portable devices, and gaming applications and the like, increases, so does the need for more durable touch screen designs. Use of lamination configurations is a known technique to enhance durability of and add features (such as conductive, anti-glare, and anti-reflective coatings) to the touch screens. For example, using a transparent, conductively coated flexible plastic material, such as transparent conductively coated PET laminated to ultrathin glass (having a glass thickness preferably less than about 0.3 mm in thickness, more preferably less than about 0.2 mm in thickness, most preferably less than about 0.1 mm thickness) as the top sheet in a conventional resistive touch screen design (as shown in FIG. 1) is known in the art of touch screen manufacturing. The coating of flexible PET with a transparent conductive coating, such as by a web coating process, is also common process knowledge.

A conventional resistive touch screen device is shown in FIG. 1. In this device, a resistive touch screen 60 uses a transparent rigid substrate 10, which can be glass or plastic. A transparent conductive thin film 20 (such as indium tin oxide in the sheet resistance range of about 150 to about 900 ohms per square, sometimes in the range of about 400 to about 600 ohms per square with a physical thickness of about 500 angstroms or less) may be deposited onto a surface 24 of substrate 10. Insulating spacer dots 30 (as known in the interactive information display art), may be arranged on surface 22 of transparent conductive film 20, in order to provide separation between surface 22 and a second transparent conductive film 51 (that is deposited on a flexible substrate 50) so as to avoid false-touch sensing of the touch screen. The transparent conductive film 51 is typically indium tin oxide, and may be deposited using a conventional coating deposition technique know as physical vapor deposition (preferably by web coating) on flexible transparent substrate 50, typically PET. This flexible transparent substrate may be laminated or attached using conventional adhesive materials to the ultrathin glass substrate 40.

Although the above configuration can work well in certain circumstances, steps involved in laminating the PET substrate to the ultrathin glass substrate can be challenging and costly. Thus, there is a need for a more economical way of furnishing a transparent conductive coated, ultrathin glass top sheet for a display device, in particular, a resistive touch device.

SUMMARY OF INVENTION

The present invention provides a method to achieve a durable touch screen without the need for lamination of the PET film or substrate to the ultrathin glass substrate for the top sheet of, for example, a resistive touch screen product configuration.

According to an aspect of the present invention, a method of manufacturing a high durability touch screen comprises deposition of a transparent conductive thin film directly on an ultrathin glass substrate, preferably using vacuum based physical vapor deposition such as sputtering. The ultrathin glass substrate may be coated with one or more transparent conductive or semi-conductive films, and may be used, for example, as the top sheet in a display or touch screen device. Furthermore, the method of the present invention may render economically the addition of other functional coatings associated with top sheets for display devices, such as anti-glare coatings or diffuser surface coatings and/or anti-reflective coatings, and/or anti-abrasion coatings or the like. Aspects of the present invention may be equally suitable for use in manufacturing resistive touch screen devices and capacitive touch screen devices.

According to another aspect of the present invention, a method of manufacturing a touch screen includes providing a first substrate having a substantially transparent conductive coating on a surface thereof and providing a sheet of glass having a thickness of less than or equal to approximately 0.3 mm. A substantially transparent conductive film is deposited on a surface of glass sheet. At least one functional coating is deposited at at least one surface of the glass sheet. The functional coating comprises at least one of an anti-glare coating, a diffuser surface coating, an anti-reflective coating and an anti-abrasion coating. At least one glass substrate is cut from the coated glass sheet and the glass substrate is assembled to the first substrate to form a touch screen device.

The glass sheet may comprise an elongated glass ribbon, and the method may include unrolling the glass ribbon from a feed roll having the glass ribbon wound at least partially therearound. The glass ribbon may be rolled or wound onto a take-up reel after the at least one functional coating is deposited on the surface.

The at least one functional coating may be deposited at a surface of the glass sheet that is opposed to the surface on which the substantially transparent conductive coating is deposited. The surface of the glass sheet may be washed before the at least one functional coating is deposited thereon.

According to another aspect of the present invention, a method of manufacturing a capacitive touch screen includes providing a first substrate having a substantially transparent conductive coating on a surface thereof and providing a glass substrate having a thickness of less than or equal to approximately 0.3 mm. At least one functional coating is deposited at a surface of the glass substrate. The functional coating comprises at least one of an anti-glare coating, a diffuser surface coating, an anti-reflective coating and an anti-abrasion coating. The glass substrate is assembled to the first substrate to form a capacitive touch screen device.

The present invention encompasses reel to reel application deposition of a transparent conductive coating (such as indium tin oxide, or doped tin oxide or the like), preferably in a vacuum environment, and achievement of further processing, such as heating, to fully form transparent conductive thin films, preferably while the ribbon of ultrathin glass traverses from the feed reel to the take-up reel in a reel to reel process. Optionally, whether in the same vacuum deposition step or before, or after, anti-reflection coatings can be deposited if desired (such as described in U.S. patent application, Ser. No. 09/883,654, filed Jun. 18, 2001 by Getz for ENHANCED LIGHT TRANSMISSION CONDUCTIVE COATED TRANSPARENT SUBSTRATE AND METHOD FOR MAKING SAME, now U.S. Pat. No. 6,787,240, which is hereby incorporated herein by reference). Further, either before or after either or both of the above operations, one or more anti-glare coatings (AGC) or diffuser surface coatings can be deposited such as by wet chemical deposition (such as disclosed in U.S. Pat. Nos. 5,725,957; 6,001,486; 6,087,012; and 6,440,491, which are hereby incorporated herein by reference). Furthermore, the functionality of the flexible ultrathin glass substrate may be further enhanced by silk screening spacer elements, which are typically referred to in the resistive touch screen art as "spacer dots" (such as described in U.S. Pat. No. 6,627,918 for SPACER ELEMENTS FOR INTERACTIVE INFORMATION DEVICES AND METHOD FOR MAKING SAME, which is hereby incorporated herein by reference), onto the ultrathin glass substrate.

Thus, as indicated above, functional coatings, such as transparent conductive coatings, anti-glare coatings or diffuser surface coatings, anti-reflective coatings and/or anti-abrasion coatings, can be applied directly to the ultrathin glass (having a glass thickness preferably less than about 0.3 mm in thickness, more preferably less than about 0.2 mm thickness, and most preferably less than about 0.1 mm thickness), preferably while a ribbon of this ultrathin glass is traversing from a feed reel to a take up reel in a reel to reel process. Alternatively, such functional coatings can be directly applied to a pre-cut sheet or pre-cut shape of ultrathin glass without the need to use a reel or a reel to reel process.

These and other objects, advantages, purposes and features of the present invention will become apparent upon review of the following specification in conjunction with the drawings.

DESCRIPTION OF THE PREFERRED EMBODIMENTS

Figure 1:
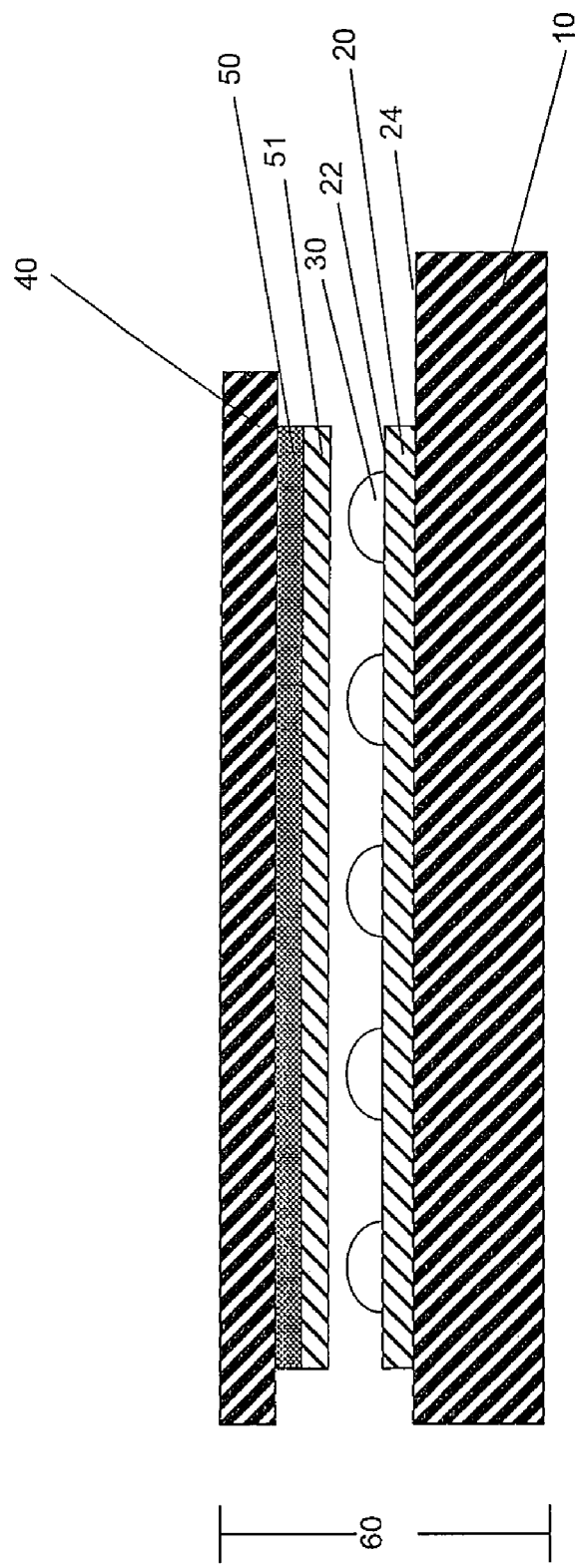
FIG. 1 is a sectional view of a conventional resistive touch screen.
Figure 2:
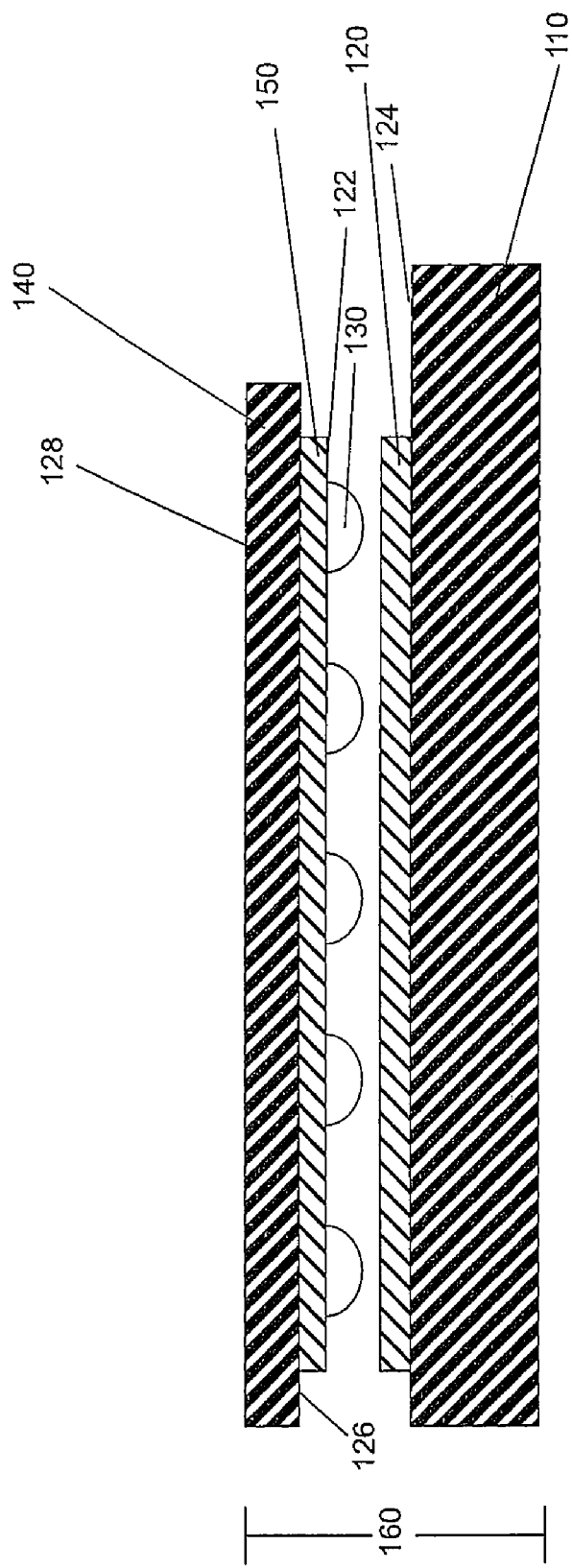
FIG. 2 is a sectional view of a resistive touch screen in accordance with the present invention.

Referring now to the drawings and the illustrative embodiments depicted therein, a resistive touch screen 160 in accordance with the present invention is shown in FIG. 2. Resistive touch screen 160 includes a transparent rigid substrate 110, which can be glass, polymeric, acrylic, plastic or the like, most preferred a transparent plastic cyclic olefin copolymer (such as described in U.S. patent application, Ser. No. 09/946,228, filed Sep. 5, 2001 by Ippel et al. for IMPROVED PLASTIC SUBSTRATE FOR INFORMATION DEVICES AND METHOD FOR MAKING SAME, which is hereby incorporated herein by reference), with a transparent conductive or semi-conductive thin film 120 (such as indium tin oxide (ITO) or the like in the sheet resistance range of about 150 to about 900 ohms per square, most preferably in the range of about 400 to about 600 ohms per square, with a physical thickness of about 500 angstroms or less) deposited thereon, such as by sputtering onto a surface 124 of substrate 110. Touch screen 160 also includes an ultrathin glass substrate 140 having a transparent conductive or semi-conductive thin film 150 (such as indium tin oxide (ITO) or the like in the sheet resistance range of about 150 to about 900 ohms per square, most preferably in the range of about 400 to about 600 ohms per square, with a physical thickness of about 500 angstroms or less) deposited on a surface 126 of substrate 140. The substrate 140 is spaced from substrate 110 and includes a plurality of spacer elements or spacer dots 130 silk-screened or otherwise applied to a surface 122 of the conductive thin film 150, as described below. A user may then touch the outer surface 128 of substrate 140, which may press substrate 140 and conductive thin film 150 toward and into contact with conductive layer 120 of rigid substrate 110 to use the touch screen 160.

Figure 3:
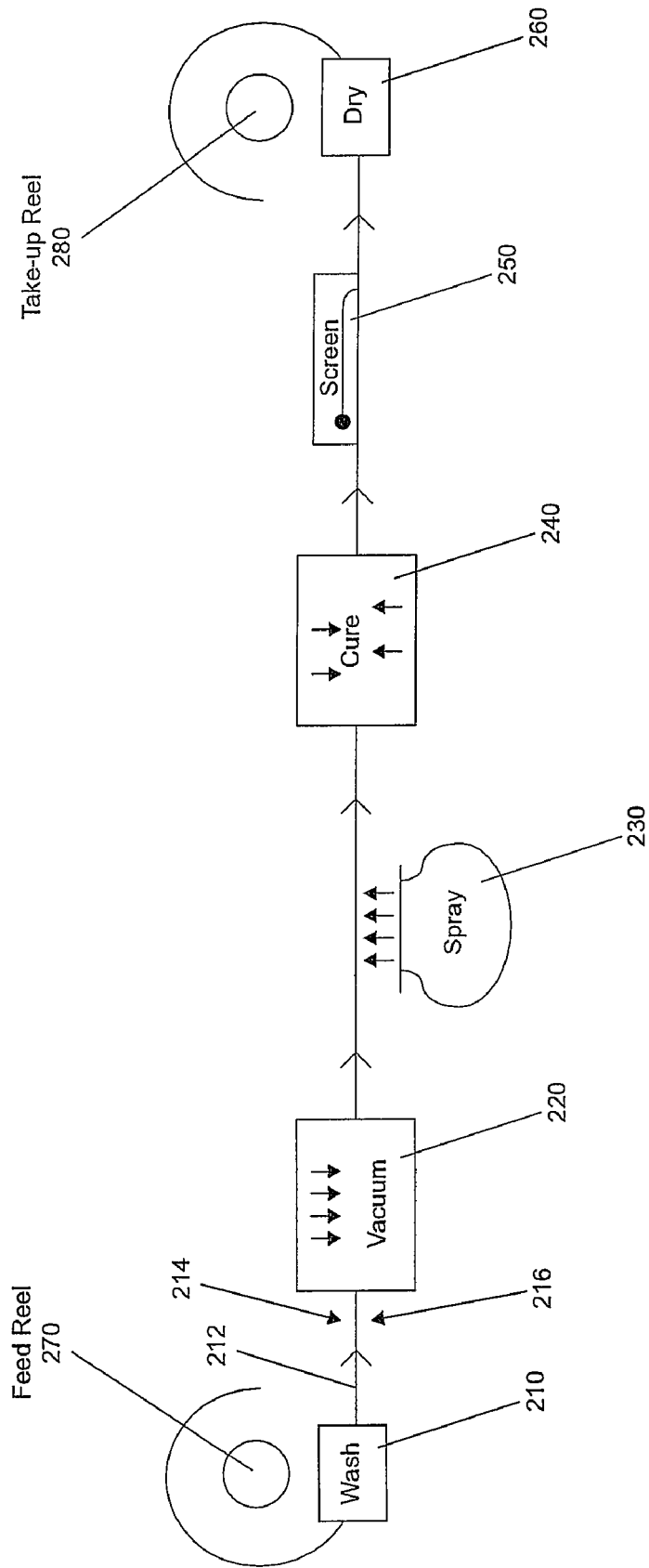
FIG. 3 is a schematic of a process for manufacturing the touch screen of FIG. 2 in accordance with the present invention.

A preferred method to fabricate the touch screen construction of FIG. 2 is shown in FIG. 3. An elongated, transparent, flexible, ultrathin glass substrate sheet or roll or ribbon 212 (which may be cut to form the ultrathin glass substrate 140 of touch screen 160) is processed in a reel to reel process as follows. The flexible ultrathin glass substrate sheet 212 is transferred, such as via any known web handling method, from a feed reel 270 into a washing system 210, such as a plasma cleaning process, electrostatic cleaning process, or ultrasonic cleaning process or the like. The washing cycle or step is followed by thin film deposition in a physical vapor deposition vacuum chamber 220. The transparent conductive thin film 150 (such as indium tin oxide (ITO) in the sheet resistance range of about 50 to about 500 ohms per square, most preferably in the range of approximately 150 to 350 ohms per square, and with a physical thickness about 500 angstroms or less) is deposited via a physical vapor deposition technique (such as sputtering or the like) on a surface 214 of the ultrathin glass ribbon 212. Optionally, an anti-reflective thin film can also be deposited at this point on one or both surfaces 214 and 216 of the ribbon 212 prior to the deposition of the conductive film.

The flexible ultrathin glass substrate ribbon 212 may then enter a spray deposition chamber 230, and an anti-glare coating or diffuser surface coating (such as disclosed in U.S. Pat. Nos. 5,725,957; 6,001,486; 6,087,012; and 6,440,491, which are hereby incorporated herein by reference) may be deposited on surface 216 of the ultrathin glass sheet or ribbon 212 via chemical spray deposition. Anti-reflective coatings can also be deposited at this point via wet chemical deposition (such as by utilizing the principles described in U.S. patent application, Ser. No. 09/883,654, filed Jun. 18, 2001 by Getz for ENHANCED LIGHT TRANSMISSION CONDUCTIVE COATED TRANSPARENT SUBSTRATE AND METHOD FOR MAKING SAME, now U.S. Pat. No. 6,787,240, which is hereby incorporated herein by reference) or by other known techniques, without affecting the scope of the present invention.

The flexible ultrathin glass substrate then enters a curing chamber 240 to cure (such as by heating, preferably by using an infrared heater, or ultraviolet heater, or convection heater or the like) the conductive thin film, the anti-glare coating and/or the anti-reflective coating. The flexible ultrathin glass substrate ribbon 212 then has spacer dots 130 silk-screened on surface 214 in a silk screen chamber 250. This is followed by a UV or low temperature thermal curing stage 260 to solidify the spacer dots (such as described in U.S. Pat. No. 6,627,918 for SPACER ELEMENTS FOR INTERACTIVE INFORMATION DEVICES AND METHOD FOR MAKING SAME, which is hereby incorporated herein by reference) followed by the winding of the flexible ultrathin glass ribbon 212 onto the take up reel 280. The finished flexible ultrathin glass sheet or ribbon 212 is then post cut using any known or conventional glass cutting methods, such as laser scribing or mechanical scoring or the like, into the desired top sheet size, ready for lamination as the top sheet of the resistive touch screen. The device is then inspected and tested electronically. The resulting product is the complete interactive information device.

Optionally, the anti-glare coating (AGC) or diffuser surface coating may be applied to or deposited on one surface/side of the ultrathin glass, and the transparent conductive layer (which may comprise a transparent conductive PET layer) may be laminated to the opposing surface/side of the anti-glare coated ultrathin glass to form the ultrathin top sheet of the touch screen device. The coatings and layers may be applied or laminated to ultrathin glass in the ribbon or roll or reel-to-reel form (as discussed above) or may be applied or laminated to ultrathin glass in a sheet or lite form, or may be applied or laminated to ultrathin glass substrates (after the substrates are cut from a sheet or lite or ribbon or roll), without affecting the scope of the present invention.

Figure 4:
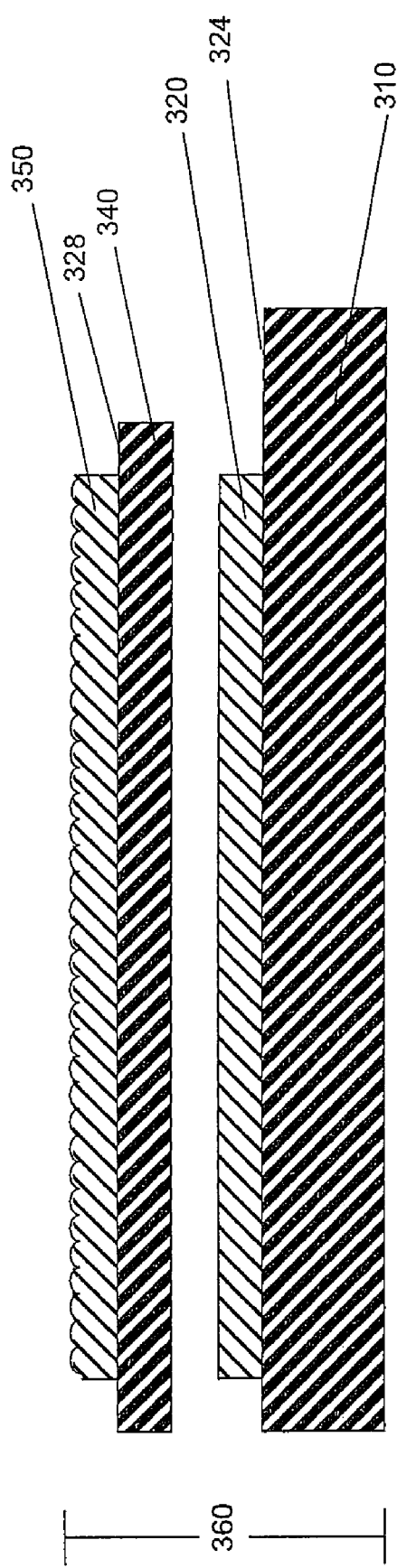
FIG. 4 is a sectional view of a capacitive touch screen in accordance with the present invention.
Figure 5:
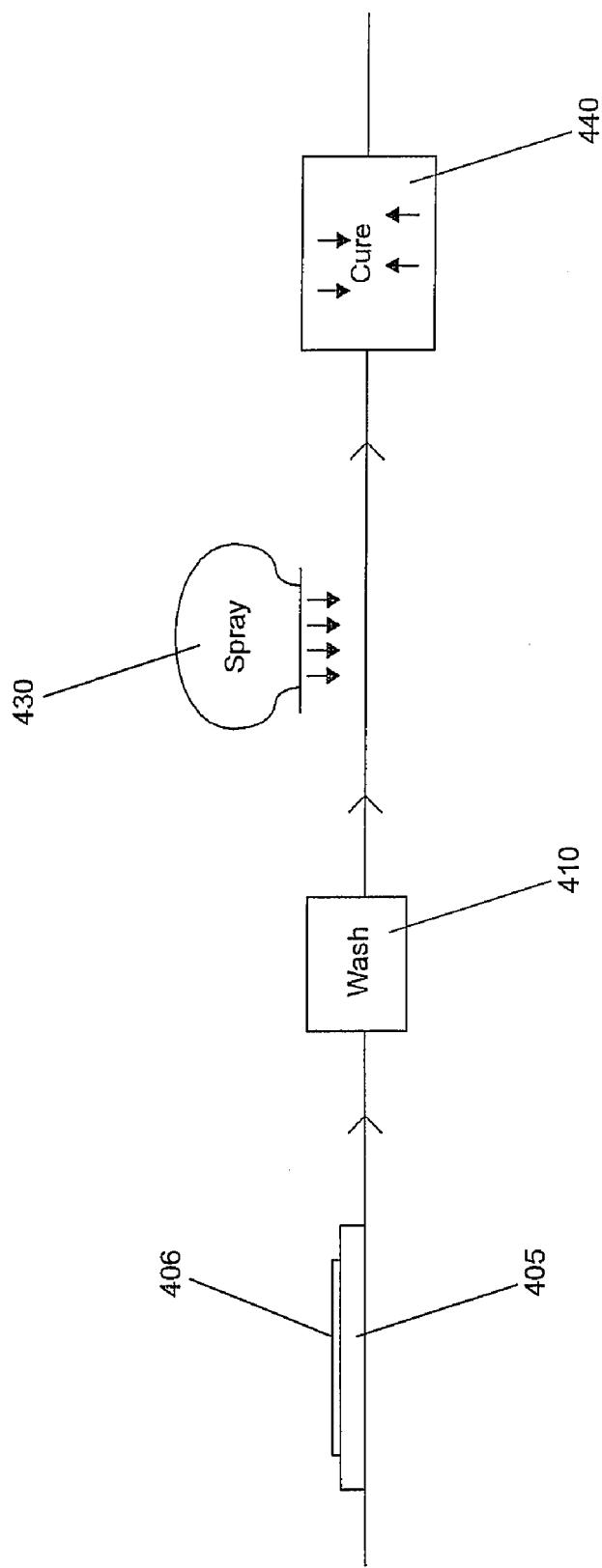
FIG. 5 is a schematic of a process for manufacturing the touch screen of FIG. 4 in accordance with the present invention.

Referring now to FIGS. 4 and 5, aspects of the present invention are also useful for capacitive touch screen technology. Such capacitive touch screens may similarly benefit from the utilization of the flexible ultrathin glass with anti-glare coatings or diffuser surface coatings, anti-reflective coatings and/or anti-abrasion coatings fabricated as described above. Ultrathin glass can be laminated directly to the capacitive touch screen product configuration providing a preferred durable capacitive touch screen.

An example of the present invention as described for a capacitive interactive touch device is shown in FIG. 4. In this device, a capacitive touch screen 360 uses a transparent rigid substrate 310, which can be glass, polymeric, acrylic, plastic or the like, most preferred a transparent plastic cyclic olefin copolymer (such as described in U.S. patent application, Ser. No. 09/946,228, filed Sep. 5, 2001 by Ippel et al. for IMPROVED PLASTIC SUBSTRATE FOR INFORMATION DEVICES AND METHOD FOR MAKING SAME, which is hereby incorporated herein by reference) with a transparent conductive thin film 320 (such as indium tin oxide or antimony doped tin oxide in the sheet resistance range of about 1000 to 3,500 ohms per square, most preferably in the range of about 1,500 to 2,500 ohms per square, with a physical thickness of about 600 angstroms or less) deposited onto a surface 324 of substrate 310. The capacitive touch screen 360 includes an ultrathin glass substrate 340, which may have an anti-glare coating or diffuser surface coating applied to or deposited on an outer surface 328 of the substrate, as discussed below.

A preferred method to fabricate the capacitive touch screen construction of FIG. 4 is shown in FIG. 5. The flexible ultrathin glass substrate 340 may be pre-cut, such as from provided sheets or lites or the like, to the desired dimensions using any known or conventional glass cutting techniques, such as laser scribing or mechanical scoring or the like. The pre-cut substrate 340 can then mounted onto the vacuum fixture 405 for transfer to a washing chamber or device or system 410 for washing the substrate, such as by using known or conventional washing techniques, such as plasma cleaning, electrostatic cleaning, or ultrasonic cleaning processes or the like. The ultrathin glass substrate mounted on the vacuum fixture then enters the wet chemical spray chamber 430 for the anti-glare coating process (such as disclosed in U.S. Pat. Nos. 5,725,957; 6,001,486; 6,087,012; and 6,440,491, which is hereby incorporated herein by reference), which deposits the anti glare coating or diffuser surface coating 350 onto the surface 328 of the ultrathin glass substrate 340. The substrate and anti-glare coating are transferred to the post curing chamber 440 to cure (such as by heating, preferably by using an infrared heater, or ultraviolet heater, or convection heater or the like), while affixed to the vacuum fixture. The finished flexible ultrathin glass top sheet is then ready for lamination as the protective top sheet of a capacitive touch-screen. The device is then inspected and tested electronically. The resulting product is the complete interactive information device.

The present invention thus provides a method for manufacturing a resistive touch screen which deposits the conductive layer or coating directly onto a surface of a sheet or ribbon or roll of ultrathin glass material, which may then be cut to the desired shape for use as the outer, ultrathin glass substrate of the touch screen. The spacer elements and/or other coatings or layers or the like may also be applied to the conductive layer of the ultrathin glass ribbon. The present invention thus provides a low cost method for manufacturing a highly durable touch screen device. The present invention also provides a capacitive touch screen and method for manufacturing the capacitive touch screen.

Changes and modifications in the specifically described embodiments may be carried out without departing from the principles of the present invention, which is intended to be limited only by the scope of the appended claims as interpreted according to the principles of patent law.

The invention claimed is:

1. A method of manufacturing a touch screen, said method comprising:

providing a first substrate having a substantially transparent conductive coating on a surface thereof;

providing a second substrate separate from said provided first substrate, said second substrate comprising a sheet of glass, said glass sheet having a thickness of less than or equal to approximately 0.3 mm;

depositing a substantially transparent conductive film on a surface of said glass sheet;

depositing at least one functional coating onto least one surface of said glass sheet, said at least one functional coating comprising at least one of an anti-glare coating, a diffuser surface coating, an anti-reflective coating and an anti-abrasion coating;

cutting at least one coated glass substrate from said coated glass sheet; and assembling said coated glass substrate to said first substrate to form a touch screen device.

2. The method of claim 1, wherein said glass sheet comprises an elongated glass ribbon.

3. The method of claim 2 including unrolling said glass ribbon from a feed roll having said glass ribbon wound at least partially therearound.

4. The method of claim 3 including rolling said glass ribbon onto a take-up reel after said at least one functional coating is deposited on said surface.

5. The method of claim 1 including disposing spacers on said surface of said glass sheet.

6. The method of claim 5, wherein said substantially transparent conductive coating, said spacers and said at least one functional coating are disposed at at least one surface of said glass sheet as said glass sheet traverses from a feed reel to a take-up reel.

7. The method of claim 1, wherein said at least one functional coating is deposited onto a surface of said glass sheet that is opposed to the surface on which said substantially transparent conductive coating is deposited.

8. The method of claim 1 including laminating said coated glass substrate to a third substrate.

9. The method of claim 1 including depositing an anti-glare coating at a surface of said glass sheet.

10. The method of claim 1 including depositing a diffuser surface coating at a surface of said glass sheet.

11. The method of claim 1 including depositing an anti-reflective coating at a surface of said glass sheet.

12. The method of claim 1 including depositing an anti-abrasion coating at a surface of said glass sheet.

13. The method of claim 1 including washing at least one surface of said glass sheet before said at least one functional coating is deposited thereon.

14. A method of manufacturing a capacitive touch screen comprising:
    providing a first substrate having a substantially transparent conductive coating on a surface thereof;
    providing a second substrate separate from said provided first substrate, said second substrate comprising a glass substrate, said glass substrate having a thickness of less than or equal to approximately 0.3 mm;
    depositing at least one functional coating onto a surface of said glass substrate, said at least one functional coating comprising at least one of an anti-glare coating, a diffuser surface coating, an anti-reflective coating and an anti-abrasion coating; and
    assembling said coated glass substrate to said first substrate to form a capacitive touch screen device.

15. The method of claim 14 including disposing spacers on said surface of said glass substrate.

16. The method of claim 14 including laminating said glass substrate to a second substrate.

17. The method of claim 14, wherein said at least one functional coating comprises an anti-glare coating.

18. The method of claim 14, wherein said at least one functional coating comprises a diffuser surface coating.

19. The method of claim 14, wherein said at least one functional coating comprises an anti-reflective coating.

20. The method of claim 14, wherein said at least one functional coating comprises an anti-abrasion coating.

21. The method of claim 14 including washing at least one surface of said glass substrate before said at least one functional coating is deposited thereon.

* * * * *

UNITED STATES PATENT AND TRADEMARK OFFICE
CERTIFICATE OF CORRECTION

PATENT NO. : 7,574,794 B2  Page 1 of 1
APPLICATION NO. : 11/625015
DATED : August 18, 2009
INVENTOR(S) : Eugene Halsey, IV and Catherine A. Getz It is certified that error appears in the above-identified patent and that said Letters Patent is hereby corrected as shown below:

Column 6:
Line 44, Claim 1, Insert --at-- before "least".

Signed and Sealed this

Ninth Day of March, 2010

David J. Kappos
*Director of the United States Patent and Trademark Office*